United States Patent
Stefek et al.

(10) Patent No.: US 10,160,386 B2
(45) Date of Patent: Dec. 25, 2018

(54) RETRACTABLE STORAGE COMPARTMENT

(71) Applicant: Collins Bus Corporation, South Hutchinson, KS (US)

(72) Inventors: Cody Stefek, Hutchinson, KS (US); Devin Ensminger, South Hutchinson, KS (US)

( * ) Notice: Subject to any disclaimer, the term of this patent is extended or adjusted under 35 U.S.C. 154(b) by 15 days.

(21) Appl. No.: 15/452,092

(22) Filed: Mar. 7, 2017

(65) Prior Publication Data
US 2018/0257574 A1 Sep. 13, 2018

(51) Int. Cl.
| | | |
|---|---|---|
| *B60R 7/00* | (2006.01) | |
| *B60R 5/04* | (2006.01) | |
| *B62D 31/02* | (2006.01) | |
| *B62D 25/10* | (2006.01) | |

(52) U.S. Cl.
CPC .............. *B60R 5/042* (2013.01); *B62D 25/10* (2013.01); *B62D 31/02* (2013.01); *B60Y 2200/143* (2013.01)

(58) Field of Classification Search
CPC . E05Y 2900/106; E05Y 2900/00; E06B 9/52; B60P 7/14; E05D 15/165; E05D 13/1261; E05D 15/242
USPC .......................................... 296/37.5; 160/201
See application file for complete search history.

(56) References Cited

U.S. PATENT DOCUMENTS

| | | | | |
|---|---|---|---|---|
| 3,645,597 | A * | 2/1972 | Sakow ..................... | A47B 3/04 160/201 |
| 5,025,964 | A * | 6/1991 | Phirippidis ............... | A47F 3/14 211/126.1 |
| 5,653,178 | A * | 8/1997 | Huczka .................... | A47B 5/04 108/135 |
| 6,065,794 | A * | 5/2000 | Schlachter ............... | B60R 5/04 296/37.16 |
| 6,571,855 | B1* | 6/2003 | Goldsmith ............. | E04B 2/827 160/199 |
| 7,661,742 | B2* | 2/2010 | Medlar .................... | B60R 5/04 296/37.14 |

(Continued)

*Primary Examiner* — Kiran B Patel
(74) *Attorney, Agent, or Firm* — Cozen O'Connor

(57) ABSTRACT

Aspects of the disclosure provide an adjustable storage panel apparatus for a vehicle (e.g., bus) that includes an upper panel assembly; a lower panel assembly, wherein an upper edge of the lower panel assembly pivotably engages a bottom edge of the upper panel assembly; opposing horizontal tracks comprising a front end and a back end, the horizontal tracks configured to be disposed on each of opposing side walls of the vehicle, wherein the lower panel assembly slideably engages each of the opposing horizontal tracks; and opposing vertical tracks comprising an upper end and a lower end, the vertical tracks configured to be disposed on each of opposing side walls of the vehicle along a vertical plane. The upper panel assembly slideably engages each of the opposing vertical tracks such that the upper and lower panel assemblies are positioned along the vertical plane in an extended position and the lower panel assembly is capable of being slid along a length of the horizontal track such that the lower panel assembly remains substantially parallel to the vertical plane and the upper panel assembly becomes oriented at an angle relative to both the vertical plane along the opposing vertical tracks and the lower panel assembly.

13 Claims, 4 Drawing Sheets

(56) References Cited

U.S. PATENT DOCUMENTS

| | | | | |
|---|---|---|---|---|
| 8,448,689 | B2* | 5/2013 | Roberts | B60J 5/14 |
| | | | | 160/201 |
| 8,814,245 | B1* | 8/2014 | Welch | B60R 7/02 |
| | | | | 296/37.16 |
| 9,080,379 | B2* | 7/2015 | Guillemette | E05D 15/262 |
| 2003/0141731 | A1* | 7/2003 | Betts | B60N 2/3013 |
| | | | | 296/24.43 |
| 2008/0000594 | A1* | 1/2008 | Paulson | E05D 15/24 |
| | | | | 160/201 |
| 2009/0194241 | A1* | 8/2009 | Mihalcheon | E05D 15/246 |
| | | | | 160/201 |
| 2012/0211177 | A1* | 8/2012 | Fletcher | E05D 15/165 |
| | | | | 160/201 |
| 2012/0234507 | A1* | 9/2012 | Rauch | E05D 13/1292 |
| | | | | 160/201 |
| 2014/0262072 | A1* | 9/2014 | Shives | E06B 3/485 |
| | | | | 160/201 |
| 2015/0053357 | A1* | 2/2015 | Reus | E04H 4/082 |
| | | | | 160/201 |

* cited by examiner

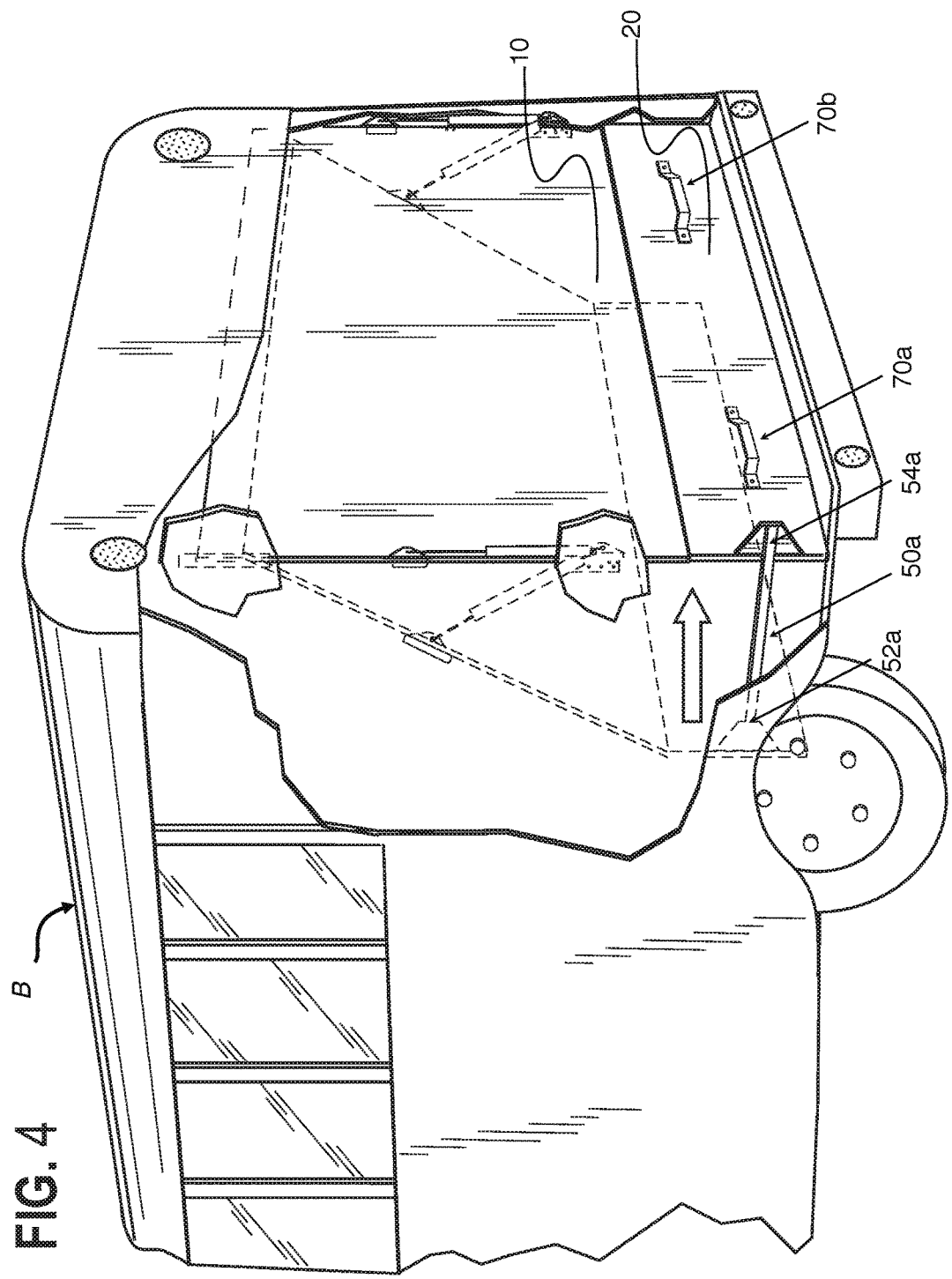

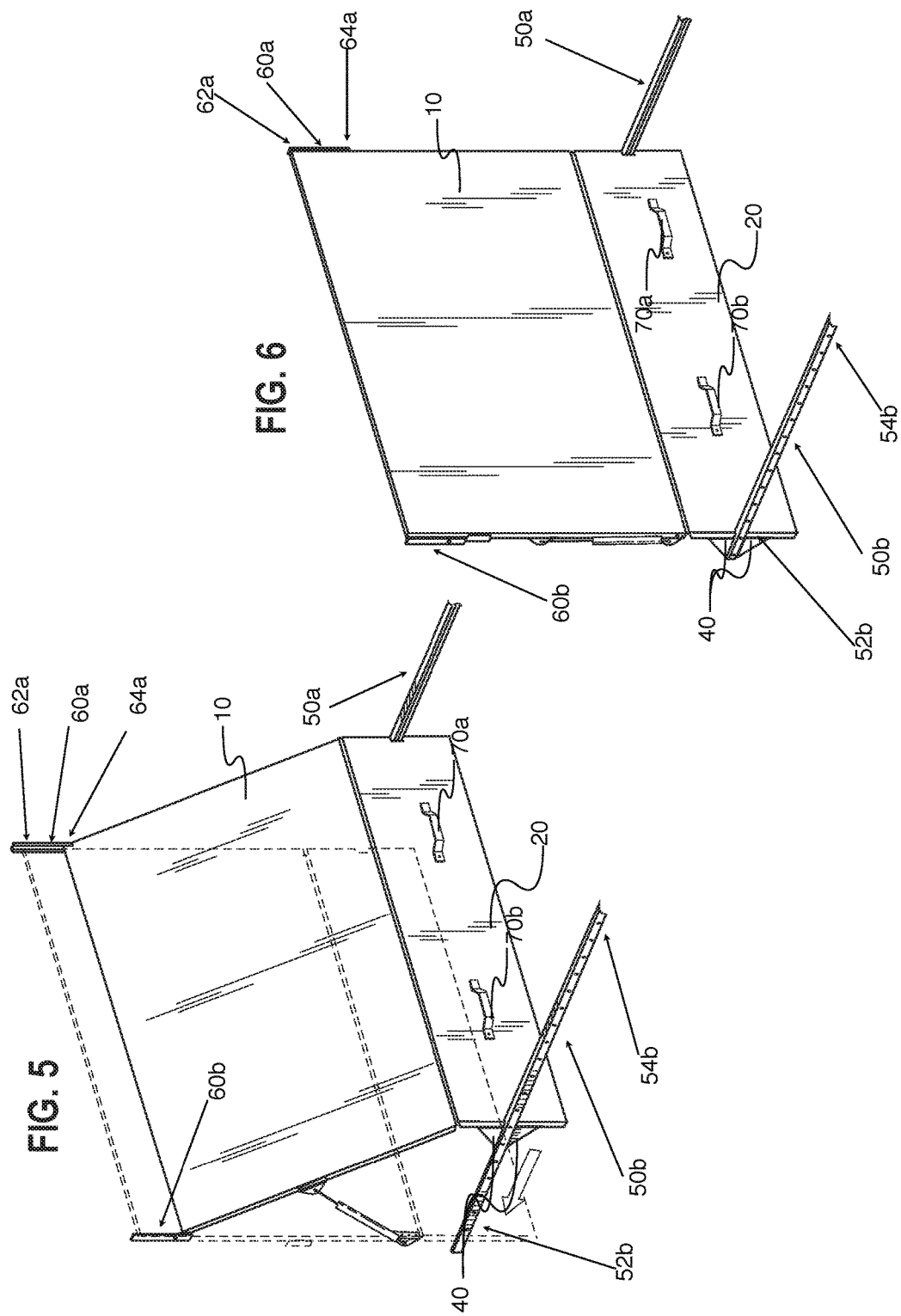

RETRACTABLE STORAGE COMPARTMENT

FIELD OF THE DISCLOSURE

This disclosure relates generally to vehicles, such as buses, and more particularly to improvements to the storage capacity of vehicles.

BACKGROUND

Bus manufacturers often try to maximize the seating capacity of buses; however, this can have the reciprocal effect of the buses not having ample storage capacity for the passengers' luggage and other belongings. Further, buses may not always need the additional storage capacity, so having a designated storage compartment can also prove to take away from potential seating availability to passengers. As a result, transporting passengers and their associated luggage via bus can pose logistical problems.

BRIEF SUMMARY

The present disclosure provides a retractable luggage compartment for vehicles (e.g., buses) that can retractably provide additional storage capacity for luggage and other items.

In one aspect, the disclosure provides an adjustable storage panel apparatus for a vehicle, comprising an upper panel assembly; a lower panel assembly, wherein an upper edge of the lower panel assembly pivotably engages a bottom edge of the upper panel assembly; opposing horizontal tracks comprising a front end and a back end, the horizontal tracks configured to be disposed on each of opposing side walls of the vehicle, wherein the lower panel assembly slideably engages each of the opposing horizontal tracks; and opposing vertical tracks comprising an upper end and a lower end, the vertical tracks configured to be disposed on each of opposing side walls of the vehicle along a vertical plane; wherein the upper panel assembly slideably engages each of the opposing vertical tracks; wherein the upper and lower panel assemblies are positioned along the vertical plane in an extended position and the lower panel assembly is capable of being slid along a length of the horizontal track such that the lower panel assembly remains parallel to the vertical plane and the upper panel assembly becomes oriented at an angle relative to both the vertical plane along the opposing vertical tracks and the lower panel assembly.

In some embodiments, the apparatus further comprises one or more strut operably connected between an outer edge of the upper panel and the side wall of the vehicle. In at least one embodiment, the apparatus comprises a strut on each of the outer edges of the upper panel operably connected to each of the opposing side walls of the vehicle. Further, the one or more strut can be connected between the outer edge of the upper panel and the side wall of the vehicle via brackets attached to each of the upper panel and the side wall. In further embodiments, the one or more struts are hydraulic struts that can be controlled remotely to drive movement of the panels along respective horizontal/vertical tracks.

In some embodiments, the upper panel assembly of the apparatus comprises a single panel or, alternatively, two or more interconnected panels. In some embodiments, the lower panel assembly of the apparatus comprises a single panel or, alternatively, two or more interconnected panels. In some embodiments, the lower panel assembly further comprises one or more panel handles.

In some embodiments, the lower panel assembly of the apparatus is in a substantially vertical orientation.

In some embodiments, the lower panel assembly slideably engages each of the opposing horizontal tracks via one or more lower panel rollers. In some embodiments, the upper panel assembly slideably engages each of the opposing vertical tracks via one or more upper panel rollers.

In some embodiments, the lower panel assembly further comprises one or more lower panel brackets abutting one or more of the opposing horizontal tracks.

In another aspect, the present disclosure provides an adjustable storage panel system for a vehicle, comprising an upper panel assembly; a lower panel assembly, wherein an upper edge of the lower panel assembly pivotably engages a bottom edge of the upper panel assembly; opposing horizontal tracks comprising a front end and a back end, the horizontal tracks configured to be disposed on each of opposing side walls of the vehicle, wherein the lower panel assembly slideably engages each of the opposing horizontal tracks; opposing vertical tracks comprising an upper end and a lower end, the vertical tracks configured to be disposed on each of opposing side walls of the vehicle along a vertical plane; wherein the upper panel assembly slideably engages each of the opposing vertical tracks; and a one or more motors operably linked to at least one of the lower panel assembly and upper panel assembly; wherein the upper and lower panel assemblies are positioned along the vertical plane in an extended position and the lower panel assembly is slideable along a length of the horizontal track such that the lower panel assembly remains parallel to the vertical plane and the upper panel assembly becomes oriented at an angle relative to both the vertical plane along the opposing vertical tracks and the lower panel assembly, wherein the one or more motors drive movement of the lower panel assembly and upper panel assembly along the opposing horizontal tracks and opposing vertical tracks, respectively.

In another aspect, the disclosure provides a vehicle, such as for example, a bus, comprising an exterior portion and an interior compartment, wherein the interior compartment comprises an upper panel assembly; a lower panel assembly, wherein an upper edge of the lower panel assembly pivotably engages a bottom edge of the upper panel assembly; opposing horizontal tracks comprising a front end and a back end, the horizontal tracks disposed on each of opposing side walls of the vehicle, wherein the lower panel assembly slideably engages each of the opposing horizontal tracks; and opposing vertical tracks comprising an upper end and a lower end, the vertical tracks disposed on each of opposing side walls of the vehicle along a vertical plane; wherein the upper panel assembly slideably engages each of the opposing vertical tracks; wherein the upper and lower panel assemblies are positioned along the vertical plane in an extended position and the lower panel assembly is capable of being slid along a length of the horizontal track such that the lower panel assembly remains parallel to the vertical plane and the upper panel assembly becomes oriented at an angle relative to both the vertical plane along the opposing vertical tracks and the lower panel assembly.

In some embodiments, the vehicle may be a bus. In further embodiments, the interior compartment of the vehicle comprises one or more motors operably linked to at least one of the lower panel assembly and upper panel assembly, wherein the one or more motors drive movement of the lower panel assembly and upper panel assembly along the opposing horizontal tracks and opposing vertical tracks, respectively.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 shows a perspective view of an adjustable storage panel apparatus of FIG. 3 in the extended position.

FIG. 5 shows a perspective view of an adjustable storage panel apparatus of an embodiment of the present disclosure in a retracted position.

FIG. 6 shows a perspective view of an adjustable storage panel apparatus of an embodiment of the present disclosure in an extended position.

DETAILED DISCLOSURE

Aspects of the present disclosure provide an adjustable storage panel apparatus/system for a vehicle. For example, the present disclosure enables a bus to provide an adjustable rear panel that is movable to form a luggage compartment or, alternatively, to provide additional space within the passenger compartment of the bus. Additional aspects of the present disclosure provide vehicles, such as a bus, that have an adjustable storage panel apparatus therein.

Figure 1:
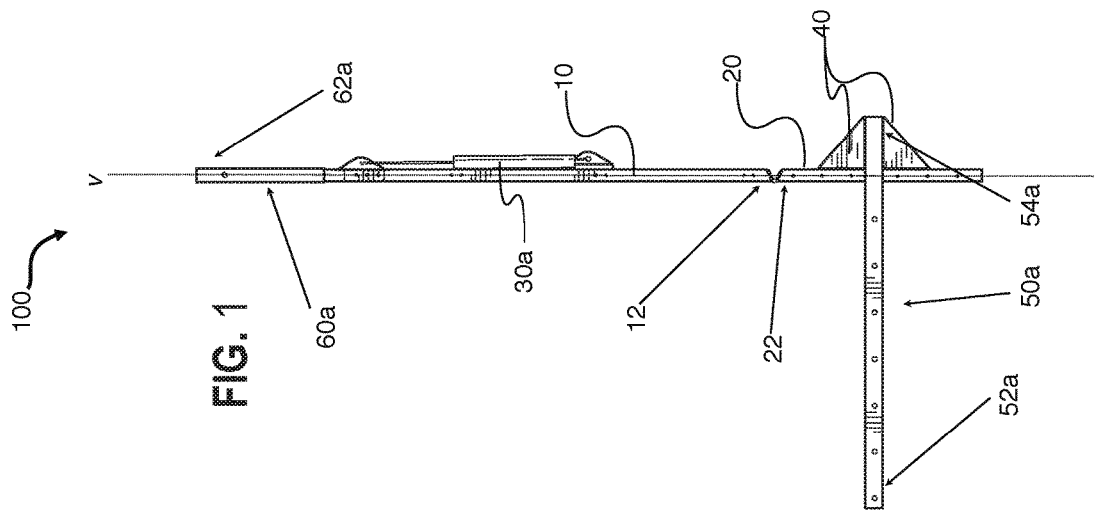
FIG. 1 shows a side view of an adjustable storage panel apparatus of an embodiment of the present disclosure in an extended position.
Figure 2:
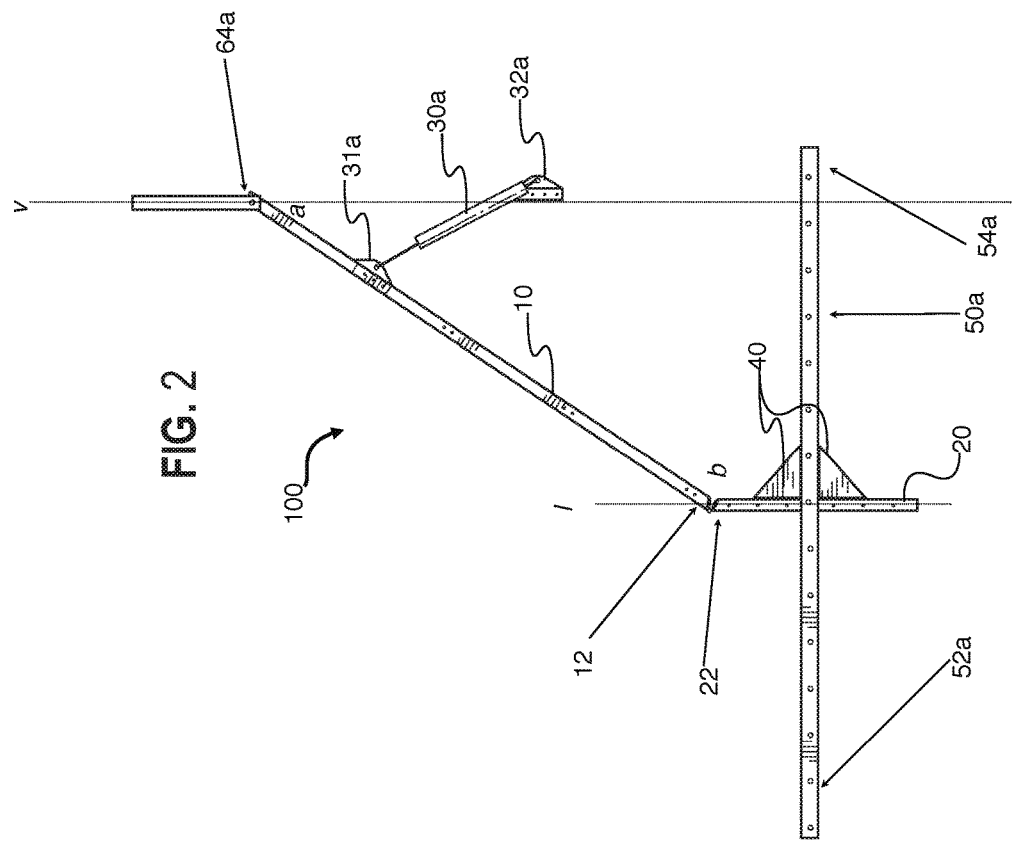
FIG. 2 shows a side view of an adjustable storage panel apparatus of an embodiment of the present disclosure in a retracted position.
Figure 3:
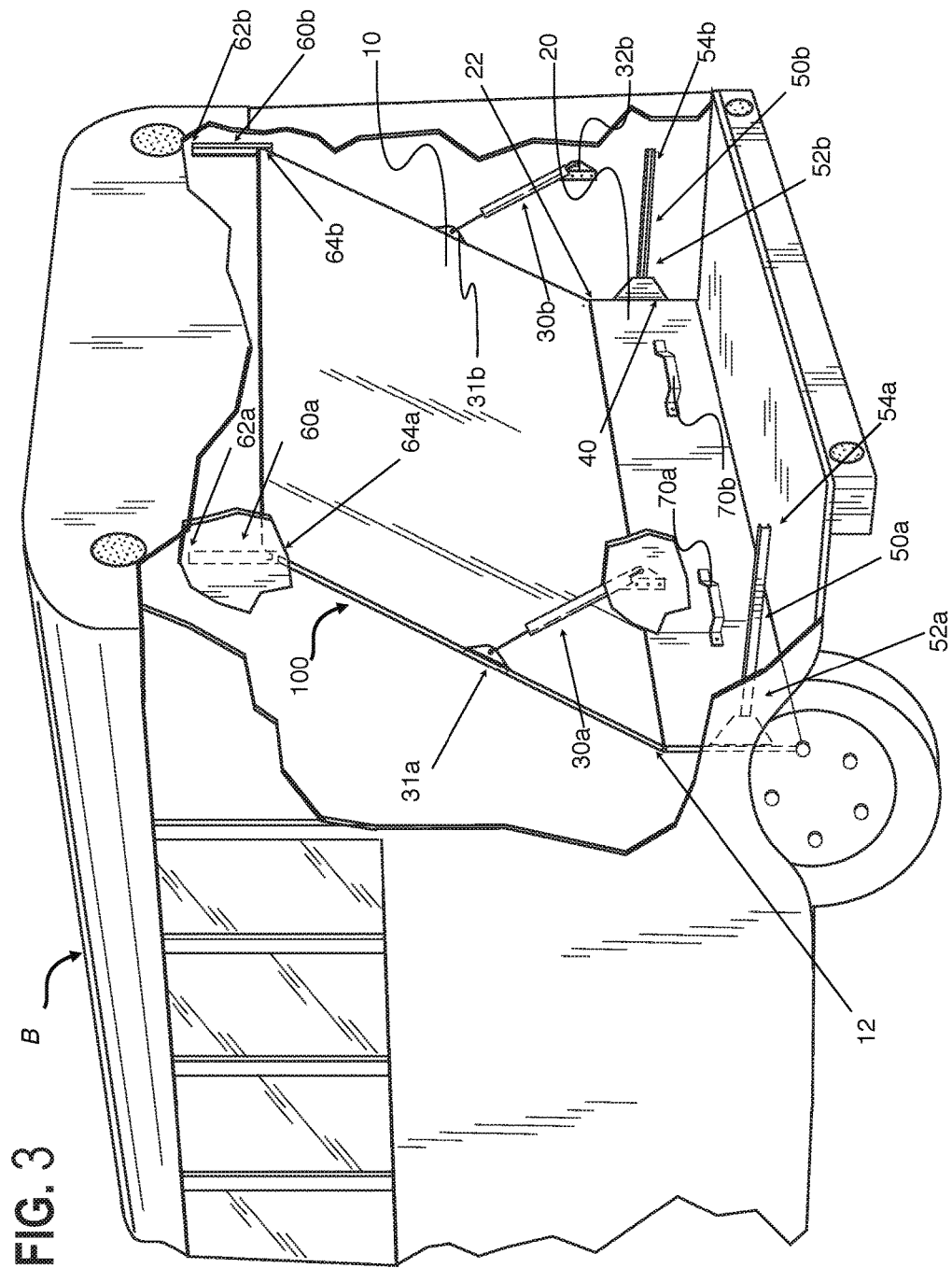
FIG. 3 shows a perspective view of an adjustable storage panel apparatus of an embodiment of the present disclosure as installed on a bus in the retracted position.

As shown in FIG. 1 and FIG. 2, an adjustable storage panel apparatus 100 of the present disclosure comprises an upper panel assembly 10 and a lower panel assembly 20. The two assemblies can be pivotally connected, by a hinge for instance, at an upper edge 22 of the lower panel assembly 20 and the bottom edge 12 of the upper panel assembly 10. In some embodiments, the pivotal connection may be provided by one or more hinges. In some embodiments, as illustrated in FIGS. 3-4, the lower panel assembly is in a substantially vertical (perpendicular) orientation relative to the floor of a vehicle in which the apparatus 100 is installed. As illustrated in FIGS. 1-2, the edges of the upper and lower panel assemblies may also have a tapered or angled shape, so as to allow the panels to hinge freely (unobstructed) relative to each other. Further, one or both of the panel assemblies may comprise one panel, or more than one panels adjoined (interconnected) together, to form each panel assembly. One or both of the entire panel assemblies may also have a frame surrounding the outer edges thereof to provide an aesthetic finish and/or to assist in holding panels in place.

As shown in FIGS. 3-4, the lower panel assembly 20 also slideably engages each of opposing horizontal tracks 50*a*, 50*b*, which are configured to be disposed on each of opposing side walls of a vehicle (e.g., bus) in which the storage panel apparatus 100 is installed. The opposing horizontal tracks each have a front end 52*a*, 52*b* and a back end 54*a*, 54*b*. Further, the upper panel assembly 10 slideably engages each of opposing vertical tracks 60*a*, 60*b* having an upper end 62*a*, 62*b* and a lower end 64*a*, 64*b*; the opposing vertical tracks are configured to be disposed on each of opposing side walls of the vehicle along a vertical plane v (as viewed from the side of the vehicle in which the apparatus is installed) (illustrated in FIGS. 1-2). As used herein, the terms "horizontal" and "vertical" should be construed to mean substantially horizontal or substantially vertical, meaning horizontal is not necessarily perfectly parallel with the earth and vertical is not necessarily perfectly perpendicular with the earth, but rather a person of ordinary skill in the art would understand that a variation of a few degrees is permissible within the scope of the disclosed embodiments.

In some embodiments, the lower panel assembly 20 slideably engages each of the opposing horizontal tracks 50*a*, 50*b* via one or more lower panel rollers. In some embodiments, the upper panel assembly 10 slideably engages each of the opposing vertical tracks 60*a*, 60*b* via one or more upper panel rollers. The rollers may include a roller (wheel), or other structures that will slide along or within the tracks, attached to each of the panel assemblies, wherein the roller slideably engages the respective track, providing a means for ease of movement of the respective panel along the respective track. As shown in FIGS. 1-6, the lower panel assembly 20 may have one or more lower panel brackets 40 attached thereto and abutting one or more of the opposing horizontal tracks 50*a*, 50*b*. The lower panel brackets 40 provide stability for the lower panel assembly 20 and may also assist in guiding the lower panel assembly 20 along the horizontal track(s). In some embodiments, the lower panel brackets 40 may have rollers abutting the horizontal tracks, providing ease of movement along the horizontal tracks.

The upper 10 and lower 20 panel assemblies may be positioned along the vertical plane v in an extended position (see FIG. 1). In the extended position, the upper panel assembly 10 slideably engages each of opposing vertical tracks 60*a*, 60*b* near the upper end 62*a*, 62*b*. Further, the lower panel assembly 20 is capable of sliding along a length of the horizontal track 50*a*, 50*b* such that the lower panel assembly 20 remains parallel to the vertical plane v and the upper panel assembly 10 becomes oriented at an angle (a) relative to the vertical plane v along the opposing vertical tracks 60*a*, 60*b* (see FIG. 2). This is the retracted position (as shown in FIG. 2). In the retracted position, the upper panel assembly 10 slideably engages each of opposing vertical tracks 60*a*, 60*b* near the lower end 64*a*, 64*b*. Further, in the retracted position, the upper panel assembly 10 becomes oriented at an angle (b) relative to the lower panel assembly 20 (and a lower panel vertical plane/running therethrough). As the position of the apparatus is moved from the extended position to the fully retracted position, angle (a) increases and angle (b) decreases and the position of the slidable engagement of the upper panel assembly 10 with the vertical tracks moves towards the lower end 64*a*, 64*b* of the vertical tracks. In some embodiments, an intermittent locking system may be utilized to permit positioning of storage panel apparatus 100 in a variety of positions other than fully retracted and fully extended. For instance, the intermittent locking system may include locks or retractable stoppers provided on or between upper panel assembly 10 and vertical tracks 60*a*, 60*b*, on or between lower panel assembly 20 and horizontal tracks 50*a*, 50*b*, or on or between both panel assemblies and tracks. The locks or stoppers may selectively secure the panels in one or more intermittent positions between fully retracted and fully extended positions. The locks or stoppers may be selectively activated, for instance through a button or other mechanism perhaps incorporated into handles 70*a*, 70*b*. The locks or stoppers may also be provided as part of brackets 40. Further contemplated as part of the intermittent locking system is selectively locking strut 30 in an intermittent position as would be understood by a person of ordinary skill in the art depending on the type of strut 30 utilized in the particular embodiment. Intermittent locking system may likewise be utilized to lock panels 10, 20 in the fully retracted or fully extended positions.

As shown in FIGS. 1-4, the apparatus may also have one or more strut 30 operably connected between an outer edge of the upper panel assembly 10 and a side wall of a vehicle. The one or more struts 30 connect to the upper panel assembly 10 via an upper panel bracket 31a, 31b. Likewise, the one or more struts 30a, 30b connect to the side wall of a vehicle via a side wall bracket 32a, 32b which may be located on or proximate to vertical plane v at a position between vertical track 64a, 64b and horizontal track 50a, 50b. In at least one embodiment, the apparatus comprises a strut 30a, 30b on both of the outer edges of the upper panel operably connected to each of the opposing side walls of the vehicle. The struts may be gas struts or coilover struts. In further embodiments, the one or more struts 30a, 30b are hydraulic struts that can be controlled remotely to drive movement of the lower and upper panels along respective horizontal/vertical tracks.

In some embodiments, the lower panel assembly 20 includes one or more handles 70a, 70b. The handles 70 may assist a user in pushing/pulling the lower panel assembly 20 along the horizontal tracks 50a, 50b to transition between extended and retracted positions. In some embodiments, the upper panel assembly 10 may include one or more handles.

The lower and upper panel assemblies may be made of any known or to be developed metal or composite material, as would be understood and utilized in the industry. One or more of the panel assemblies can also include windows therein with transparent panels or, alternatively, an entire panel assembly can be a transparent panel.

In additional aspects, the adjustable storage panel apparatus may be included as a system for a vehicle that includes one or more motors. The one or more motors may be operably linked to at least one of the lower panel assembly and upper panel assembly such that the one or more motors drive movement of the lower panel assembly and upper panel assembly along the opposing horizontal tracks and opposing vertical tracks, respectively.

In another aspect, the disclosure provides a vehicle, such as for example, a bus, comprising an exterior portion and an interior compartment, wherein the interior compartment comprises an adjustable storage panel apparatus as described herein. A bus B comprising the apparatus described herein is illustrated in FIGS. 3-4. Furthermore, the interior compartment of the vehicle may include one or more motors operably linked to at least one of the lower panel assembly and upper panel assembly, wherein the one or more motors drive movement of the lower panel assembly and upper panel assembly along the opposing horizontal tracks and opposing vertical tracks, respectively.

In a further aspect, the assembly may be rotated such tracks 50a, 50b, 60a, 60b as well as strut brackets 32a, 32b may be provided on the side walls of vehicle. Accordingly, in such an embodiment lower panel assembly 20 would move along one of the vehicle side walls.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims.

We claim:

1. An adjustable storage panel apparatus for a vehicle, comprising:
    an upper panel assembly;
    a lower panel assembly, wherein an upper edge of the lower panel assembly pivotably engages a bottom edge of the upper panel assembly;
    opposing horizontal tracks comprising a front end and a back end, the horizontal tracks configured to be disposed on each of opposing side walls of the vehicle, wherein the lower panel assembly slideably engages each of the opposing horizontal tracks; and
    opposing vertical tracks each comprising an upper end and a lower end, the vertical tracks configured to be disposed on each of opposing side walls of the vehicle along a vertical plane,
    wherein the upper panel assembly slideably engages each of the opposing vertical tracks, and
    wherein the upper and lower panel assemblies are positioned along the vertical plane in an extended position and the lower panel assembly is capable of being slid along a length of the horizontal track such that the lower panel assembly remains substantially parallel to the vertical plane and the upper panel assembly becomes oriented at an angle relative to both the vertical plane along the opposing vertical tracks and the lower panel assembly.

2. The apparatus of claim 1, further comprising one or more strut operably connected between an outer edge of the upper panel and the side wall of the vehicle.

3. The apparatus of claim 2, comprising a strut on each of the outer edges of the upper panel operably connected to each of the opposing side walls of the vehicle.

4. The apparatus of claim 2, wherein the one or more strut is connected between the outer edge of the upper panel and the side wall of the vehicle via brackets attached to each of the upper panel and the side wall.

5. The apparatus of claim 1, wherein the upper panel assembly comprises a single panel.

6. The apparatus of claim 1, wherein the upper panel assembly comprises two or more interconnected panels.

7. The apparatus of claim 1, wherein the lower panel assembly comprises a single panel.

8. The apparatus of claim 1, wherein the lower panel assembly comprises two or more interconnected panels.

9. The apparatus of claim 1, wherein the lower panel assembly further comprises one or more panel handles.

10. The apparatus of claim 1, wherein the lower panel assembly is in a substantially vertical orientation.

11. The apparatus of claim 1, wherein the lower panel assembly slideably engages each of the opposing horizontal tracks via one or more lower panel rollers.

12. The apparatus of claim 1, wherein the upper panel assembly slideably engages each of the opposing vertical tracks via one or more upper panel rollers.

13. The apparatus of claim 11, wherein the lower panel assembly further comprises one or more lower panel brackets abutting one or more of the opposing horizontal tracks.

* * * * *